(12) United States Patent
Andre et al.

(10) Patent No.: US 6,600,109 B1
(45) Date of Patent: Jul. 29, 2003

(54) CABLE PROTECTOR AND MANAGER

(75) Inventors: Bartley K. Andre, Menlo Park, CA (US); Daniel J. Coster, San Francisco, CA (US); Daniele De Iuliis, San Francisco, CA (US); Richard P. Howarth, San Francisco, CA (US); Jonathan P. Ive, San Francisco, CA (US); Duncan Robert Kerr, San Francisco, CA (US); Matthew Dean Rohrbach, San Francisco, CA (US); Douglas B. Satzger, San Carlos, CA (US); Calvin Q. Seid, Palo Alto, CA (US); Christopher J. Stringer, Pacifica, CA (US); Eugene Antony Whang, San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/099,872

(22) Filed: Mar. 14, 2002

(51) Int. Cl.[7] .................................................. H01B 7/40
(52) U.S. Cl. .................... 174/135; 24/115 R; 24/129 R; 248/74.2
(58) Field of Search ........................ 174/135, 138 F, 174/138 G, 138 R, 154, 155, 156, 163 R; 24/115 R, 129 R; 248/51, 74.1, 74.2; 439/147

(56) References Cited

U.S. PATENT DOCUMENTS

| | | | | |
|---|---|---|---|---|
| 4,930,193 A | * | 6/1990 | Baker | 24/129 R |
| 5,033,169 A | * | 7/1991 | Bindon | 24/129 R |
| 5,166,478 A | * | 11/1992 | Sprouse | 174/138 F |
| 5,168,128 A | * | 12/1992 | Thomsen | 174/135 |
| 5,209,441 A | * | 5/1993 | Satoh | 248/74.2 |
| 5,338,898 A | * | 8/1994 | Luciano et al. | 174/138 F |
| 5,442,138 A | * | 8/1995 | Ochi | 174/138 F |
| 5,844,775 A | * | 12/1998 | Lundberg | 174/135 |
| 6,227,502 B1 | * | 5/2001 | Derman | 248/74.4 |
| 6,380,488 B1 | * | 4/2002 | Takeda et al. | 174/135 |

FOREIGN PATENT DOCUMENTS

| | | | | |
|---|---|---|---|---|
| FR | 2702100 A1 | * | 9/1994 | 174/135 |

OTHER PUBLICATIONS

"Welcome to the Data Path Online Store", Data Path, Inc., Cable Assemblies, Cabling Systems and Networking Equipment, http://www.datapathinc.com/shopcart/index.cfm?category=12–127, Feb. 1, 2002, pp. 1–2.
"The Coil'n'Carry™ Handle", TFI–Toleeto Fasteners International http://www.cord–lox.com/coilncarry.html, Feb. 1, 2002, p. 1.
"The Buckle–Grommet Rack–up", Rack–ups, TFI–Toleeto Fasteners International, http://www.cord–lox.com/bg.html, Feb. 1, 2002, p. 1.
"Velco® One–Wrap® Straps"TFI–Toleeto Fasteners International, http://www.cord–lox.com/onewrap.html, Feb. 1, 2002, p. 1.

* cited by examiner

Primary Examiner—Dean A. Reichard
Assistant Examiner—Adolfo Nino
(74) Attorney, Agent, or Firm—Beyer Weaver & Thomas, LLP

(57) ABSTRACT

Techniques for protecting and managing cables during storage and use are described. The apparatus of the invention is an integration of two functional components that are used with cables of all types. First is a protective component that protects the ends of cables, which are referred to as connectors. These connectors can be plugged into devices such as computers and peripheral devices such that the respective components can be interconnected. The second component is a cable management component, which is used to manage the length of the cable. A very common example of the second component and its use is a cable clip that secures a cable that is wound up in a coil. In a general sense, the invention is the combination of the protective component and the cable management component into a single apparatus.

22 Claims, 8 Drawing Sheets

CABLE PROTECTOR AND MANAGER

FIELD OF THE INVENTION

The present invention relates generally to interconnection cables, and more specifically to devices for managing and protecting such cables.

BACKGROUND OF THE INVENTION

Cables of many types connect various kinds of components such as personal computers, laptop computers, hand-held devices, external storage devices and other peripheral devices. These cables commonly transfer power and/or input and output signals between respective components. Cables, for instance, are commonly used to supply a computer with the necessary power and to connect a monitor to the computer. A couple of challenges accompanying the use of cables are the constant battle to prevent entanglement of the cables and the protection of the connecting ends of the cables.

The challenge of tangled cables during usage and storage is a very familiar nuisance to users today. This is especially true as the number of cables used increases with the growing number of computing and peripheral devices. In addition to presenting itself in a very untidy manner, tangled cables also become safety and fire hazards. The protection of the ends of the cables that actually plug into components is critical since damage, dust, dirt, etc. can prevent the proper functioning of the cable. The ends of cables have become even more vulnerable today as cables are frequently plugged, unplugged, and transported together with mobile computing devices and peripherals.

Addressing the entanglement problem today are devices such as straps, commonly referred to as "twisty-ties" or "tie wraps," which bind cables together. Separate devices, such as caps, are sometimes used to protect the ends of cables. Unfortunately, such straps and caps are often discarded, lost, cut apart or otherwise usable after their initial use.

In view of the foregoing, devices that can both efficiently manage the length of cables and protect their connecting ends would be desirable.

BRIEF SUMMARY OF THE INVENTION

The present invention is directed to an apparatus and method for using the apparatus to protect and manage the use of cables. This device is an integration of two functional components that are used with cables of all types. First is a protective component that protects the ends of cables, which are referred to as connectors. These connectors can be plugged into devices such as computers and peripheral devices such that the respective components can be interconnected. The second component is a cable management component, which is used to manage the length of the cable. A very common example of the second component and its use is a cable clip that secures a cable that is wound up in a coil. In a general sense, the invention is the combination of the protective component and the cable management component into a single apparatus.

One aspect of the present invention pertains to a cable management and protection device that has a protective cap and a cable clip. The protective cap has an open end capable of securely fitting over at least a portion of the connector, whereby the protective cap protects the connector from physical damage and contamination. The cable clip removably secures a section of the cable's length in order to manage the length of the cable, and wherein the cable clip is connected to the protective cap.

A second aspect of the present invention pertains to a cable management and protection device that contains a protective tube and a cable clip. The protective tube has two open ends, each end capable of securely fitting over at least a portion of a respective one of the connectors. The cable clip removably secures a section of the cable's length in order to manage the length of the cable, wherein the cable clip is connected to the protective tube.

Another aspect of the present invention pertains to method for using the cable management and protection device during storage and use of a cable.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to a cable protection and management device. This device is an integration of two functional components that can be used with cables of all types. First is a protective component that protects the ends of cables, which are referred to as connectors. These connectors can be plugged into devices such as computers and peripheral devices such that the respective components can be interconnected. The performance of these cables can be adversely affected if the contact points on the connectors become physically damaged or contaminated. The protective component of the invention serves to ensure that the cable can perform at its optimal level. The second component is a cable management component, which is used to manage the length of the cable. A very common example of the second component and its use is a cable clip that secures the length of a cable. In a general sense, the invention is the combination of the protective component and the cable management component into a single apparatus. The invention is useful in its ability to both protect the connectors of a cable and to manage the length of a cable. The ability to perform both functions allows the invention to become a useful throughout the entire life of a cable since it can be used during storage and actual use of the cable. The manner of using the invention will be described in more detail below. The concept of the cable protection and management device can be useful in a wide variety of applications. For example, the invention can be used in applications ranging from input/output cables that connect electronic components to power cables. One specific example of an input/output cable is Apple Computer, Inc.'s FireWire®. FireWire is a widely used peripheral standard used in the computing industry today.

Figure 1A:
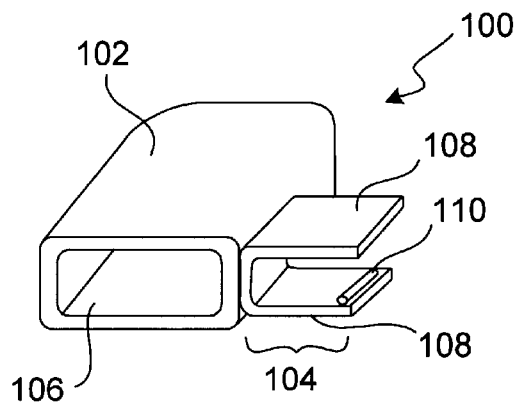
FIGS. 1A–1C illustrate three views of a protection and management device according to one embodiment of the present invention.
Figure 1B:
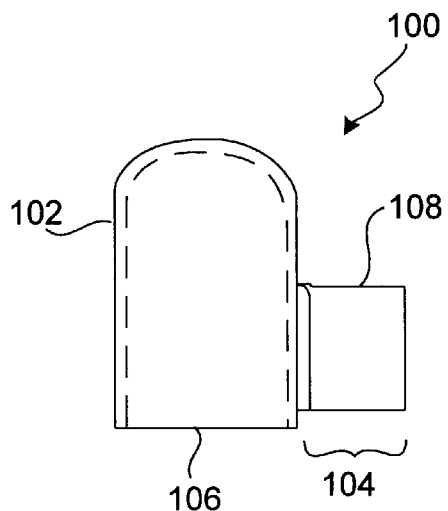
Figure 1C:
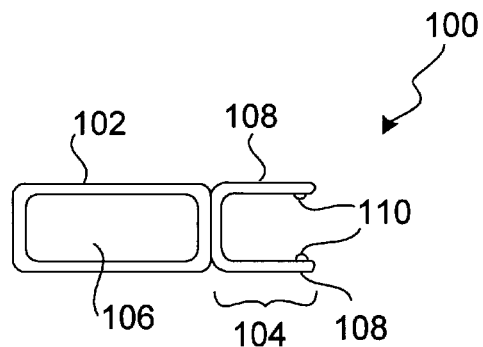

The discussion will now turn to the figures of this specification. FIGS. 1A–1C illustrate three views of a protection and management device according to one embodiment of the present invention. FIG. 1A illustrates a perspective view of device 100; FIG. 1B illustrates a top plan view of device 100; and FIG. 1C illustrates a front plan view of device 100.

Referring to FIGS. 1A–1C, device 100 consists generally of two components: a protective cap 102 and a cable clip 104. Protective cap 102 is a hollow chamber that has a single opening 106, which is shaped to fit over a connector of a cable. Cable clip 104 is a clip formed of two flanges 108 extending in the same general direction so that each flange 108 can grip and secure one or more lengths of a cable. An elongated retention nub 110 extends along the inner surface of each flange 108, which serves to hold the cable(s) within cable clip 104. In some embodiments, the mere frictional force between clip 104 holds the cable within clip 104 and makes retention nubs 110 optional.

Protective cap 102 protects a cable's connector from contact with external objects that may damage the connector. Protective cap also prevents contaminants, such as dust, from settling on the connectors. In some embodiments of cap 102, opening 106 can be made to form at least a semi-hermetic seal capable of keeping moisture from reaching the connector. Cap 102 is formed of a material having sufficient structural integrity to withstand forces that are typical for situations in which a specific cable may be used. For example, plastic or polypropylene should have sufficient strength to withstand normal stresses imposed by personal computer users. Materials having higher strength should be used for protector and management devices designed for cables used in situations likely to experience higher impact forces. For instance, metal or thicker plastics can be used for devices designed for heavy-duty input/output or power cables.

Protective cap 102 can take on many shapes and sizes. A protective cap can be shaped in as many different ways as there are shapes of connectors so that the cap fits over the connector. Also, the cap can be shaped in a variety of ways so that the cap has an external shape that is conducive for integration with other systems. For instance, the cap can have an external shape that is relatively flat so that it can be stored in a space efficient manner. The internal surface of the cap, which fits over the connector, can have a different shape than the external surface of the cap, depending upon design criteria. Protective cap 102 can have a impermeable surface such as the solid surface shown in FIGS. 1A–1C, or cap 102 can have a permeable surface. For example, the surface can be porous and protects the connector only from contact with large objects.

As will be shown in the following figures, the connector can have more than one opening so that it can protect more than one connector of a cable. Another way to protect more than one connector is to add another protective cap to protective cap 102.

Cable clip 104 can take on many different structural configurations so long as they can securely hold one or more cables. For instance, the clip can have a "C" shape and it can have a latching clasp. The clip can have a width that extends along the entirety of cap 102 or it can be a narrow width such that flanges 108 are more like prongs. Clip 104 could also be a wire or string that can be tied around the cable. Cable clip 104 can have flanges 108 that are long enough to secure many lengths of a cable that is, for example, wound up into a coil. Alternatively, clip 104 can be short and only able to secure one portion of a cable. In an alternative embodiment, clip 104 can have an inner surface containing grooves for securing each length of cable placed into the clip.

The primary use of clip 104 is to secure or manage the length of the cable during storage or use. For instance, during storage of a cable, the cable can be wound up and secured by clip 104. Or, during use of the cable, the clip can secure a selected length of the cable such that just enough of the cable is available for use. For instance, clip 104 can be used to secure a length of the cable such that excess length of the cable does not become tangled between two devices that are connected by the cable.

Figure 2:
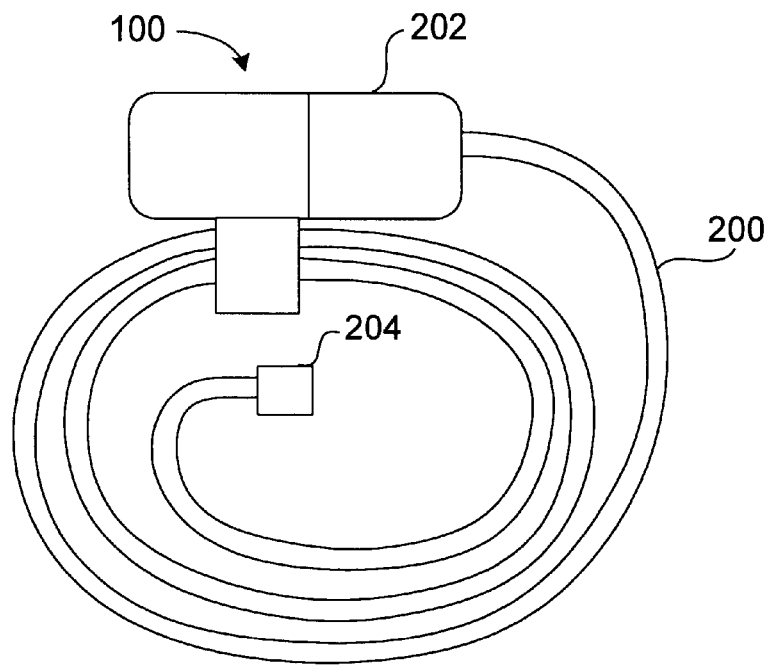
FIG. 2 illustrates a top plan view of the device of FIGS. 1A–1C that is being used to store a cable.

FIG. 2 illustrates a top plan view of device 100 that is being used to store cable 200. Clip 104, in this case, secures two windings of cable 200. Cap 102 covers and secures connector 202. Note that in FIG. 2, cable 200 has a free-hanging connector 204 that is not covered by a cap. The following figures will describe embodiments of device 100 that can protect both connector ends of a cable.

Figure 3:
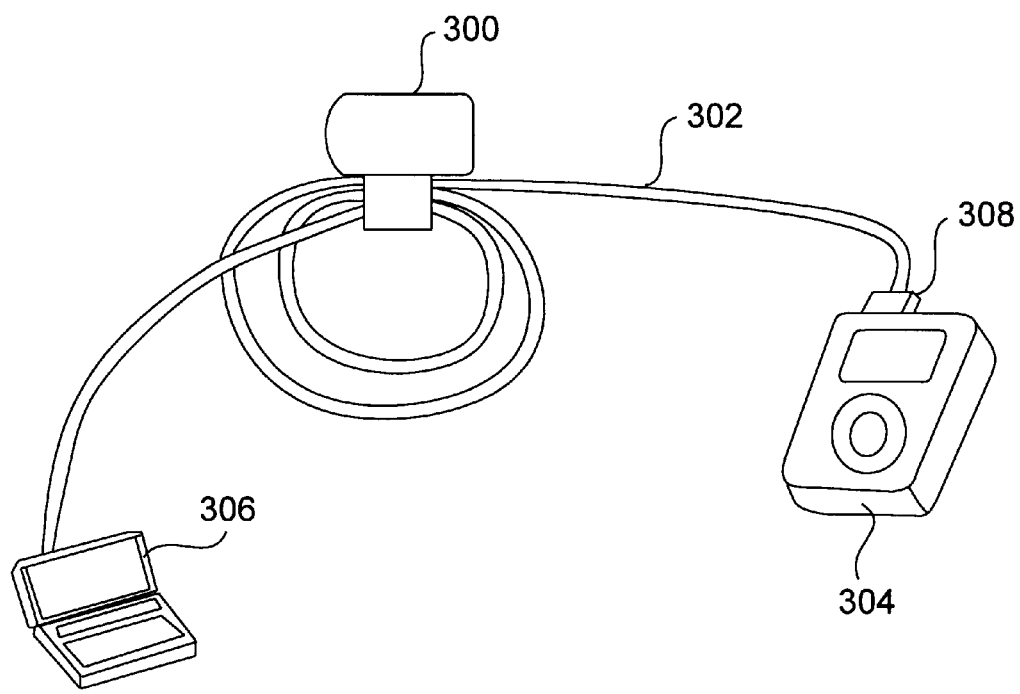
FIG. 3 illustrates a perspective view of the device of FIGS. 1A–1C that is used during use of a cable that connects two electronic devices.

FIG. 3 illustrates a perspective view of a device 300 that is used during use of a cable 302 that connects two electronic devices 304 and 306. During such use, device 300 secures a desired length of cable 302, and connector 308 is unplugged from device 300 and then each end of cable 302 is plugged into a respective electronic device 304 and 306. A user adjusts the amount of cable length secured by the clip of device 300 so that a convenient amount of cable is used.

The connection between cap 102 and clip 104 can be anywhere along the surface of cap 102. In FIG. 1A–1C, clip 104 is attached to a side surface of cap 102. This configuration gives device 100 a thin profile, which is more convenient for cable storage. However, it is also possible to attach clip 104 to either of the larger top and bottom surfaces or the end surface, which is opposite of opening 106. The location of the attachment point between cap 102 and clip 104 is dependent upon the design goals for the specific protection and management device.

Figure 4A:
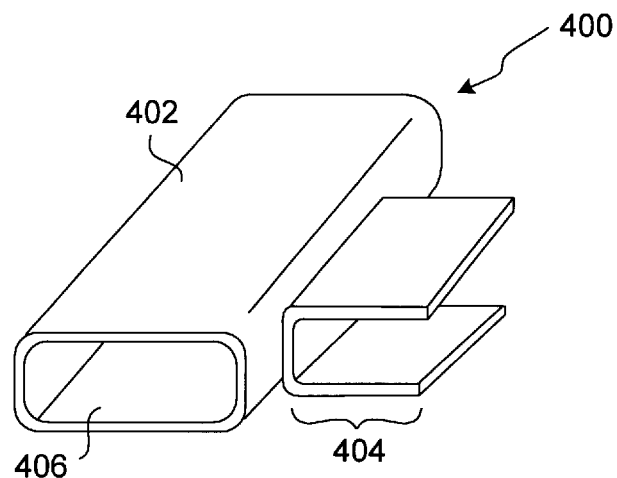
FIGS. 4A–4C illustrate three different views of an alternative embodiment of a protector and management device in which the device has openings to secure two connectors.
Figure 4B:
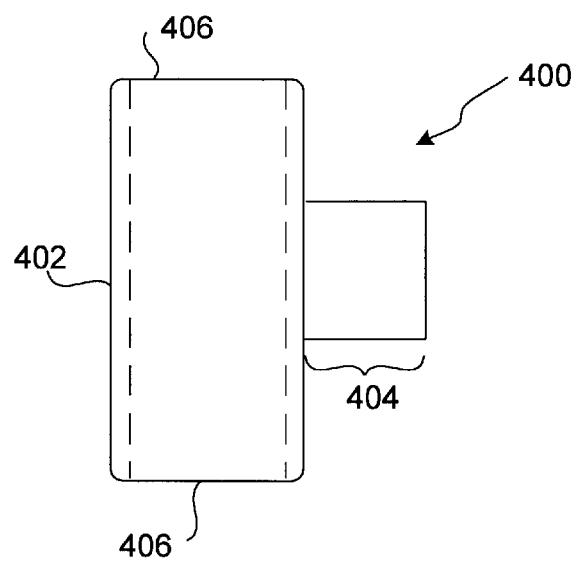
Figure 4C:
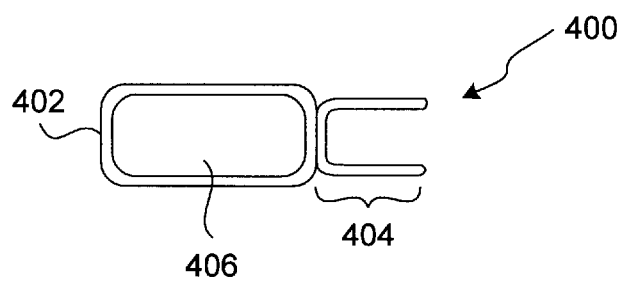

FIGS. 4A–4C illustrate three different views of an alternative embodiment of a protector and management device 400 in which device 400 has openings to secure two connectors. FIG. 4A illustrates a perspective view of device 400; FIG. 4B illustrates a top plan view of device 400; and FIG. 4C illustrates a front plan view of device 400.

Referring to FIGS. 4A–4C, device 400 consists generally of two components: a protective cap 402 and a cable clip 404. Cable clip 404 is similar to clip 104 of FIGS. 1A–1C in that it serves to secure a desired length of a cable during storage or use. Device 400 is different from device 100 in that protective cap 402 is a hollow tubular chamber having an opening 406 at both ends. Each opening 406 is shaped to fit over a connector of a cable. The hollow chamber houses and protects the inserted connectors. Essentially, device 400 is designed to protect two connectors of a cable.

Figure 5:
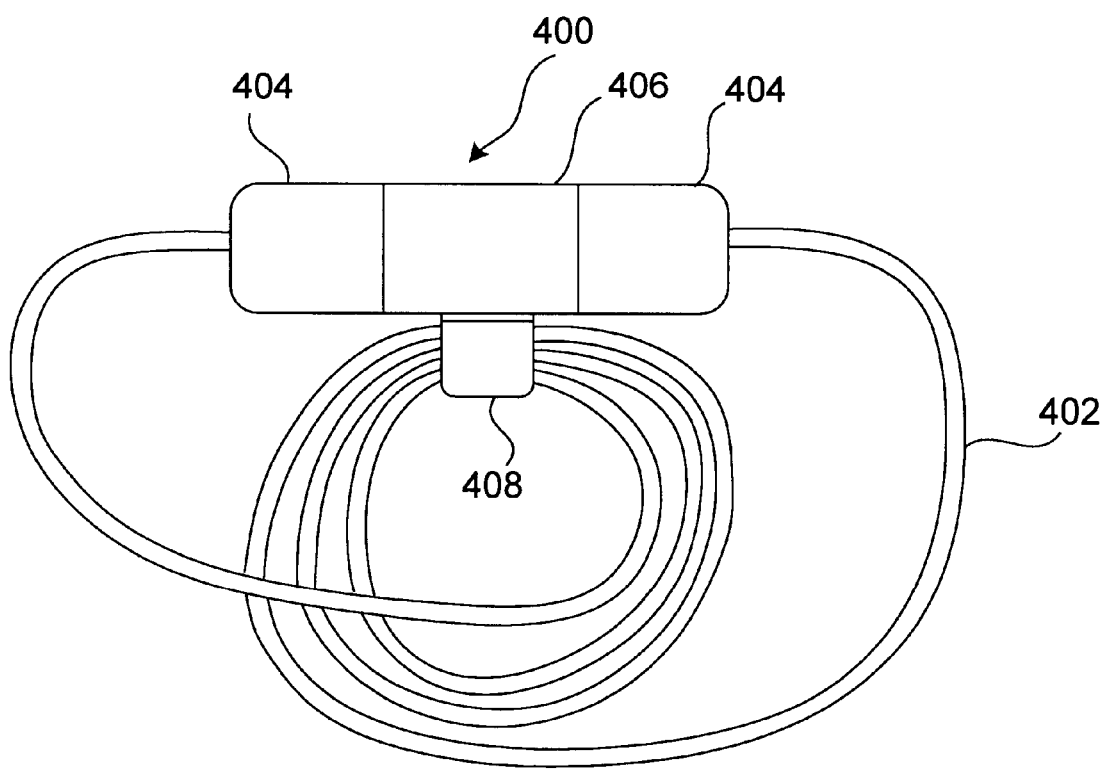
FIG. 5 illustrates a top plan view of the device of FIGS. 4A–4C that is used to store a cable wherein both connectors of a cable are placed in the protective cap.

FIG. 5 illustrates a top plan view of device 400 that is used to store a cable 402 wherein both connectors 404 of cable 402 are placed in a protective cap 406 of device 400. The length of cable 402 is placed into clip 408 so that cable 402 can be conveniently stored. Needless to mention, device 400 can also be used during use of cable 402 in a similar manner as shown in FIG. 3.

Figure 6A:
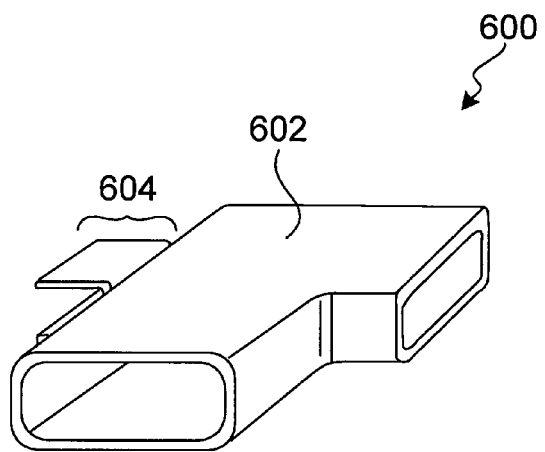
FIGS. 6A–6C illustrate three different views of an alternative embodiment of a protector and management device in which the device has a bent shape to accommodate angular-shaped connectors.
Figure 6B:
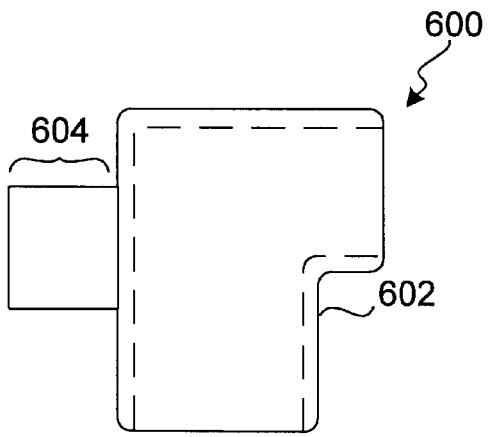
Figure 6C:
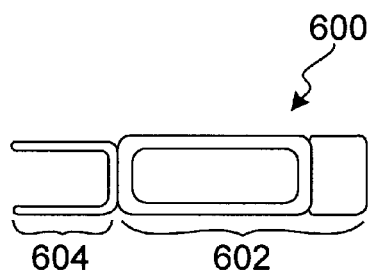

FIGS. 6A–6C illustrate three different views of an alternative embodiment of a protector and management device 600 in which device 600 has a bent shape to accommodate angular shaped connectors. FIG. 6A illustrates a perspective view of device 600; FIG. 6B illustrates a top plan view of device 600; and FIG. 6C illustrates a front plan view of device 600.

Referring to FIGS. 6A–6C, device 600 consists generally of two components: a tubular chamber 602 and a cable clip 604. Tubular chamber 602 turns about a 90-degree corner and has an opening at each end that fits about a connector. The angled tubular chamber 602 is shaped so that it can more conveniently secure a connector that has an angled configuration. For instance, a connector that also turns 90-degrees would fit into tubular chamber 602 such that the cable could more easily wind into a coil and be secured by clip 604. Device 600 can be formed such that tubular chamber 602 bends in a variety of angles in order to accommodate variously shaped connectors.

Figure 7A:
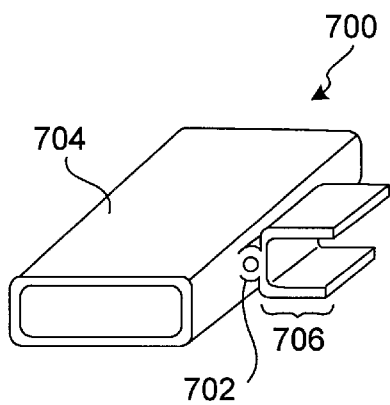
FIGS. 7A–7C illustrate three views of an alternative embodiment of a protection and management device that includes a cable locking element.
Figure 7B:
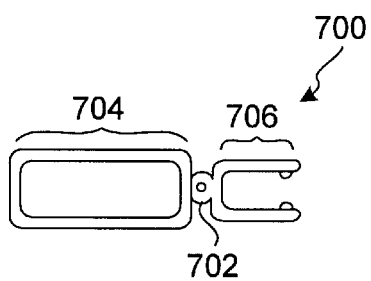
Figure 7C:
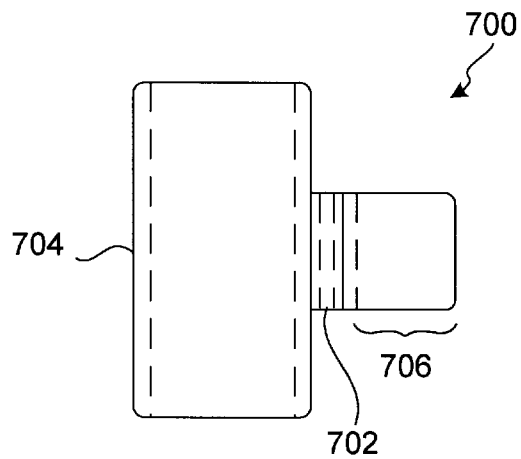

FIGS. 7A–7C illustrate three views of an alternative embodiment of device 700 that includes a cable locking element 702. FIG. 7A illustrates a perspective view of device 700; FIG. 7B illustrates a top plan view of device 700; and FIG. 7C illustrates a front plan view of device 700. Cable locking element 702 is a structure that completely wraps around the diameter of a cable so that element 702 is permanently secured to the cable. Locking element 702 is attached to tubular chamber 704 and clip 706. Therefore, locking element 702 permanently secures device 700 to a cable. Locking element 702 can be useful in preventing a user from losing device 700 since it will always be attached to the cable. Locking element 702 can used with any of the various embodiments of the protective and management device described in this specification. Locking element 702 can be attached at a variety of locations about device 700.

In alternative embodiments of the protective and management device, locking element can be formed to secure a cable to the device in a secure but non-permanent manner. For example, locking element 702 could also be a clamp having a locking latch or any other similar locking mechanism.

Figure 8:
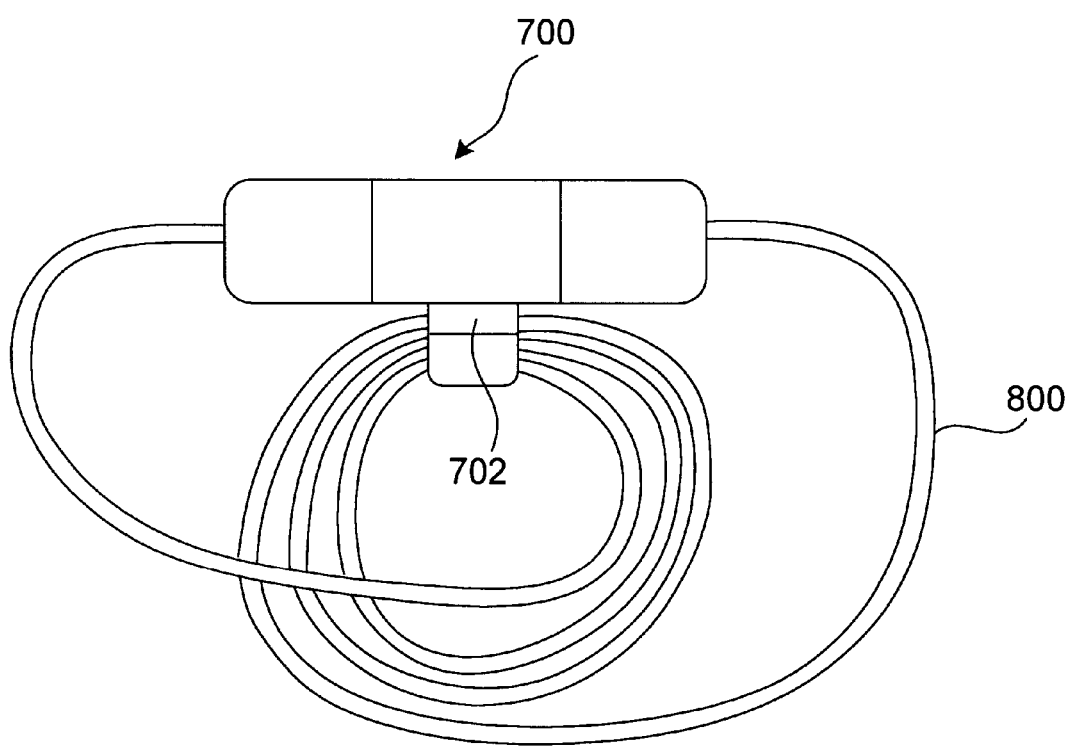
FIG. 8 illustrates a top plan view of the device of FIGS. 7A–7C that is locked to a cable by a locking element.

FIG. 8 illustrates a top plan view of device 700, of FIGS. 7A–7C, that is locked to a cable 800 by locking element 702.

Figure 9A:
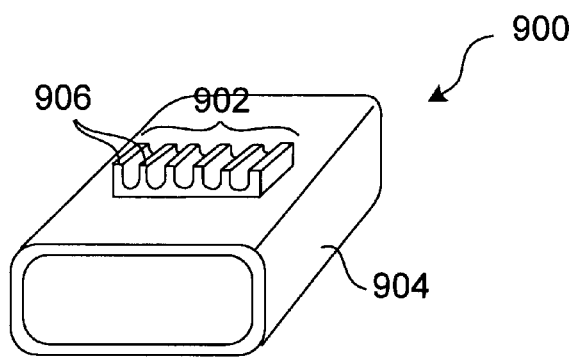
FIGS. 9A–9C illustrate three views of an alternative embodiment of a protection and management device that includes a multi-clasp clip.
Figure 9B:
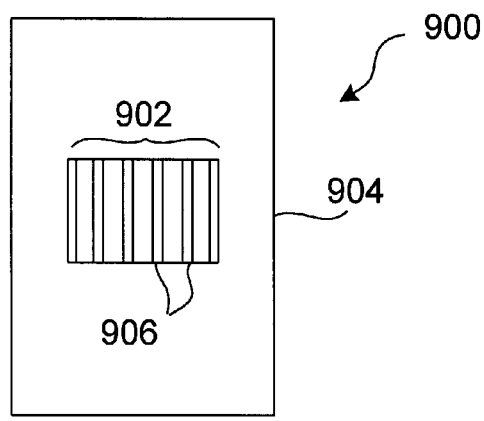
Figure 9C:
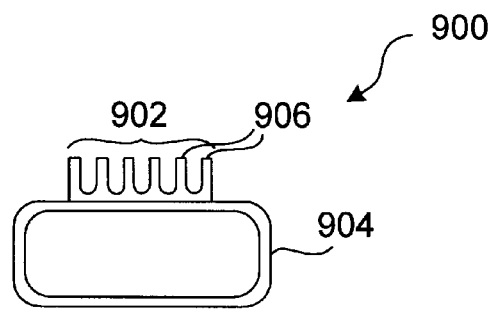

FIGS. 9A–9C illustrate three views of an alternative embodiment of device 900 that includes a multi-clasp clip 902. FIG. 9A illustrates a perspective view of device 900; FIG. 9B illustrates a top plan view of device 900; and FIG. 9C illustrates a front plan view of device 900.

Referring to FIGS. 9A–9C, device 900 generally includes two components: a protective tubular chamber 904 and the multi-clasp clip 902 that is attached to chamber 904. Multi-clasp clip 902 contains multiple clasps 906 in which each pair of clasps 906 can secure a single winding of cable. The multi-clasp clip 902 is formed such that an appropriate number of clasp pairs can securely manage the length of a cable during storage. During cable usage, only the required number of clasp pairs need to be used in order to manage the length of a cable. As in the other described embodiments of the invention, multi-clasp clip 902 can be secured to tubular chamber 904 at various points.

The protective and management device of the present invention, can be formed to have a variety of shapes and configurations. Some more alternative embodiments are discussed here. In one embodiment, the cap does not completely cover a connector for protection purposes and serves mainly to securely hold the connector. Such an embodiment serves mainly to secure the connector and manage the cable length. This embodiment may be useful for cables that have connectors that are more durable and do not need a protective covering. One example of such a device would be one in which the cap is actually a simple plastic ring that fits over and secures a connector.

In another embodiment of the invention, the devices can have a male and female connector component that allows two or more devices to be attached to each other. The male/female connectors allow multiple devices and their respective cables to be conveniently stored and/or used together.

In yet other embodiments of the invention, the protective and management device can have multiple protective caps or tubes to accommodate cables that have more than one connector at each end. For example, RCA cables, commonly used to connect audio-visual equipment, are actually a combination of three cables (two for audio signals, one for a video signal). A protection and management device having three tubes or six individual caps can be used to secure and protect each of the six RCA cable connectors.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A cable management and protection device for use with a cable, which has a connector that can be connected to an external apparatus, the device comprising:

a protective cap having an open end capable of securely fitting over at least a portion of the connector, whereby the protective cap protects the connector from physical damage and contamination; and a cable clip capable of removably securing a section of the cable's length in order to manage the length of the cable, and wherein the cable clip is connected to the protective cap; and a cable locking element that is connected to the protective cap and the cable clip such that the cable locking element is positioned between the protective cap and the cable clip, wherein the cable locking element is configured to lock the cable management and protection device to the cable.

2. A cable management and protection device as recited in claim 1 wherein the open end of the protective cap faces a first direction and the cable clip has two prongs that extend in a second direction, the second direction being perpendicular from the first direction.

3. A cable management and protection device as recited in claim 1 wherein the protective cap has four side surfaces that define the open end and a top surface that is opposite to the open end, and wherein the cable clip is connected to one of the side surfaces.

4. A cable management and protection device as recited in claim 1 wherein the cable clip is further configured to secure multiple sections along the length of the cable in order to manage the length of the cable.

5. A cable management and protection device as recited in claim 1 further comprising a plurality of cable clips wherein each cable clip secures a section along the length of the cable in order to manage the length of the cable.

6. A cable management and protection device as recited in claim 5 wherein each of the plurality of cable clips are positioned adjacent to each other.

7. A cable management and protection device as recited in claim 1 wherein the cable clip has a pair of clasping prongs, the cable clip further comprising:
a retention nub formed on the inner surface of each prong, the retention nubs configured to retain a section of the cable within the clasping prongs of the clip.

8. A cable management and protection device as recited in claim 1 wherein the cable is of a type selected from the group consisting of an input/output cable and a power cable.

9. A cable management and protection device for use with a cable that has a connector on each end, the connectors capable of being connected to external components, the device comprising:
a protective tube having two open ends, each end capable of securely fitting over at least a portion of a respective one of the connectors, whereby the protective tube protects the connectors from physical damage and contamination; and
a cable clip capable of removably securing a section of the cable's length in order to manage the length of the cable, and wherein the cable clip is connected to the protective tube; and
a cable locking element that is connected to the protective tube and the cable clip such that the cable locking element is positioned between the protective tube and the cable clip, wherein the cable locking element is configured to lock the cable management and protection device to the cable.

10. A cable management and protection device as recited in claim 9 wherein the cable clip has two prongs that extend in a direction that is perpendicular to a longitudinal axis of the protective tube.

11. A cable management and protection device as recited in claim 9 wherein the cable clip is further configured to secure multiple sections along the length of the cable in order to manage the length of the cable.

12. A cable management and protection device as recited in claim 9 further comprising a plurality of cable clips wherein each cable clip secures a section along the length of the cable in order to manage the length of the cable.

13. A cable management and protection device as recited in claim 12 wherein each of the plurality of cable clips are positioned adjacent to each other.

14. A cable management and protection device as recited in claim 9 wherein the protective tube is bent such that each open end is directed in a unique angular orientation.

15. A cable management and protection device for use with a cable, which has a connector that can be connected to an external component, the device comprising:
a connector securing means for securing the connector; and
a cable securing means for removably securing multiple sections of the cable's length in order to manage the length of the cable, and wherein the cable securing means is connected to the connector protecting means.

16. A cable management and protection device as recited in claim 15 further comprising a plurality of cable securing means wherein each cable securing means secures a section along the length of the cable in order to manage the length of the cable.

17. A cable management and protection device as recited in claim 16 wherein each of the plurality of cable securing means are positioned adjacent to each other.

18. A cable management and protection device as recited in claim 15 further comprising:
a cable locking means for locking the cable to the cable management and protection device, wherein the cable locking means is connected to the cable securing means.

19. A cable management and protection device as recited in claim 15 wherein the connector securing means protects the connector from physical damage and contamination.

20. A cable management and protection device as recited in claim 15 wherein the cable securing means comprises:
a clip having two elongated prongs that form a slot within which multiple sections of the cable can be secured.

21. A method for using a cable management and protection device for use with a cable that has a first and second connector at each end of the cable, the respective connectors capable of being connected to external components, and wherein the cable management and protection device comprises a protective cap that is integrally formed with a cable clip, the method comprising:
inserting the first connector into an opening of the protective cap in order to protect the first connector; and
securing multiple portions of the cable's length within the cable clip in order to manage the length of the cable, whereby the inserting and securing operations facilitate convenient storage of the cable.

22. A method as recited in claim 21 further comprising:
unplugging the first connector from the protective cap;
plugging the first connector into a first external component;
plugging the second connector into a second external component; and
adjusting the amount of the cable within the cable clip such that an optimum length of cable is available for use while the first and second connectors are plugged into the first and second external components, respectively.

* * * * *